United States Patent [19]

Olander

[11] Patent Number: 4,552,768
[45] Date of Patent: Nov. 12, 1985

[54] BACON BIT FINISHING METHOD

[75] Inventor: John W. Olander, Diablo, Calif.

[73] Assignee: Westland Foods Corporation, Concord, Calif.

[21] Appl. No.: 593,343

[22] Filed: Mar. 26, 1984

[51] Int. Cl.$^4$ .............................................. A22C 0/00
[52] U.S. Cl. .................................. 426/480; 426/646; 426/393
[58] Field of Search ................ 426/418, 480, 393, 92, 426/608, 646, 518, 523, 478, 479; 241/23

[56] References Cited

U.S. PATENT DOCUMENTS

| | | | |
|---|---|---|---|
| 2,402,967 | 8/1946 | Lubenow | 241/23 |
| 3,429,713 | 2/1969 | Nelson | 426/243 |
| 4,446,159 | 5/1984 | Roth | 426/646 |

OTHER PUBLICATIONS

Anon. 1977, The Bacon Ends Add the Flavor, Meat Industry 23(2)38.
Anon. 1978, Southern Living, 13:196.

Primary Examiner—Raymond Jones
Assistant Examiner—Carolyn Paden
Attorney, Agent, or Firm—Townsend and Townsend

[57] ABSTRACT

A method for finishing cooked bacon bits through vibration of the finished product. Larger and smaller pieces of bacon are cooled to a temperature below 20° F. and vibrated for a period of time sufficient to dislodge fines adhering to the surface of the larger pieces. The vibration also smooths the rough edges on the larger pieces and improves appearance and increases pourability during use.

6 Claims, 1 Drawing Figure

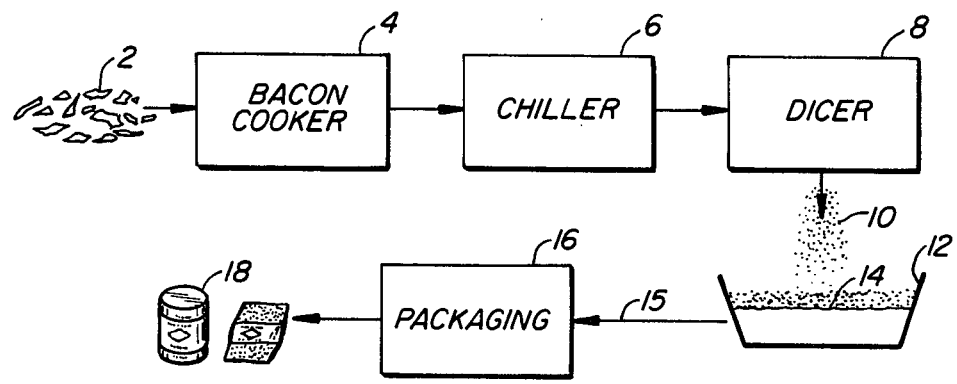

BACON BIT FINISHING METHOD

BACKGROUND OF THE INVENTION

This invention relates to a method for finishing cooked bacon bits which improves their visual appearance and pourability.

Cooked bacon bits are widely used as a garnish on salads, potato skins, baked potatoes and vegetables. Bacon bits are also often used as an ingredient in omelettes, quiche, cheese sauces and with prepared meat and fish dishes. Bacon bits from real bacon, as opposed to vegetable protein food products made to resemble cooked and crumbled bacon, are made two primary ways. One is to grind the raw bacon and cook it. The other is to cook pieces of bacon, chill the cooked bacon and then pass the cooked, chilled bacon through a dicer. The cooking-dicing method is often preferred because particles of bacon making up the bacon bits are true pieces, not ground clumps of bacon. With either method, however, the resulting bacon bits will be made up of larger pieces and much smaller pieces called fines.

With some applications, such as when the bacon bits are used at a salad bar, it is very desirable that the bacon bits appear as uniform, relatively large pieces. One way to doing this is to separate the fines from the larger pieces and sell the two components separately. Since fines can make up about 30% of the weight of bacon bits, this necessarily raises the price of the separated bacon pieces greatly because of a lower market value for fines.

SUMMARY OF THE INVENTION

Bacon, even when completely cooked, has a relatively high fat content. Applicant has found that the fat on cooked bacon is in two forms: as a surface coating left by fat which has been rendered out by the cooking process, but not completely drained away; and in fat cells within the bacon structure which survive the cooking process. When making bacon bits, the cooked bacon, when ground or diced, tends to break up into a wide range of particle sizes. Fat cells are ruptured when the bacon is cut or sheared and a portion of the released fat is spread over the surface of the bacon particles by the knives or shearing equipment. Further, the act of cutting or grinding the bacon results in a temperature increase at the point of compression or shear, which facilitates the spread of released fat. Particles so coated tend to agglomerate with the fines tending to adhere to the surface of the larger pieces thus masking the true nature and dimensions of the larger pieces. Part of applicant's contribution to the art is the discovery and recognition of this problem in which the fines mask the true nature of the larger pieces in a batch of bacon bits.

Applicant has invented a method for finishing the cooked bacon bits to substantially eliminate agglomeration and sticking of fines to the larger pieces. To do so the bacon bits are cooled, preferably to a temperature below about 20° F., and vibrated sufficiently so that the fines are dislodged from the surface of the pieces. The vibration is of a character which jars the bacon bits. The cold temperature of the bacon bits and the jarring from the vibration causes the fines to be quickly dislodged from the larger pieces. This typically occurs after about 2-3 seconds when the bacon bits are about 0° F. and increases to about 20 seconds when the bacon bits are about 20° F. This finishing step allows the true nature of the larger pieces to show and yet does not result in an excessive separation of fines from the larger pieces.

Bacon bits finished according to the present invention are of a much higher quality than a batch of similarly made but unfinished bacon bits because the fines no longer mask the larger pieces. Therefore, the entire lot takes on the general appearance of the larger, average sized pieces. Because of this readily noticeable visual difference the user has an impression of improved quality of the product. The greater visibility of the larger pieces can result in the use of less bacon to achieve the equivalent consumer satisfaction, thus resulting in lowered cost of the bacon containing product.

A surprising result of the vibration or agitation of the bacon bits is that the torn or twisted edges of the particles, which result naturally from the cutting or shearing of the bacon by mechanical equipment, are substantially removed. This helps to give a better particle definition in all particle sizes to enhance the quality of the final product.

An unexpected advantage of the present invention is that the finished product is more pourable compared with unvibrated bacon bits. The bacon bits, after the finishing vibration step, clump up less resulting in greater ease in handling. This is particularly helpful in subsequent processing steps during which the finished bacon bits are packaged. Enhanced pourability is also important to the user for proper portion control and for smooth operation of automatic blending and filling equipment.

Other features and advantages of the present invention will appear from the following description in which the preferred embodiment has been set forth in detail in conjunction with the accompanying drawing.

BRIEF DESCRIPTION OF THE DRAWINGS

FIG. 1 is a schematic block diagram outlining the process steps used with processing and finishing bacon bits according to the present invention.

DETAILED DESCRIPTION OF THE PREFERRED EMBODIMENT

Referring now to FIG. 1, pieces of raw bacon 2 are cooked by a bacon cooker 4 and then cooled in a cooked bacon chiller 6. Chiller 6 is typically a walk-in cooler set to cool the cooked bacon to a temperature below about 20° F., although somewhat higher temperatures (20° F.–40° F.) can be used as well. Alternatively, chilling can be achieved in a continuous manner while conveying the cooked bacon to the size reduction equipment. After being cooled, the chilled bacon is chopped up in a conventional dicer 8. Other types of size reduction equipment, such as grinders or choppers, can be used as well. Dicer 8 is adjustable according to the average size of bacon bits 10 desired. The temperature of the chilled bacon must be controlled; if it is too cold, the bacon is shattered rather than cut, thus resulting in many more small pieces than is usually desired. The foregoing steps are generally conventional.

With the present invention, the bacon bits 10 from dicer 8 are cooled to a temperature below about 20° F. and finished on a vibrator 12. One type of vibrator which can be used is a 30-inch vibrating screen, made by SWECO Inc. of Los Angeles, Calif., using a number 20 or smaller screen 14. Vibrator 12 moves with both a horizontal motion and a vertical motion. However, other types of vibratory motion may be used as well to achieve proper agitation so long as bacon bits 10 are jarred by vibrator 12. Bacon bits 10, which are made up of larger pieces and smaller particles or fines, are vibrated until the fines no longer adhere to the larger pieces. This typically takes only about 2-3 seconds when the bacon bits are cooled to about 0° F. and can range up to about 20 seconds when the temperature is about 20° F. During this process, bacon bits 10 also have their sharp or ragged edges rounded off by the vibration. Therefore both the larger and the smaller pieces have more well-defined appearances compared with their appearances before finishing.

Screen 14 is chosen of a size so that none or substantially none of the fines pass through the screen. However screen 14 has a sufficiently rough surface to provide the proper degree of agitation to bacon bits 10. In lieu of screen 14, a solid surface, having a roughened surface texture appropriate to the condition and size of bacon bits 10 and the particular vibrator 12, can be used. The finished bacon bits 15 are then packaged at a packager 16 for shipment in various containers as packaged products 18.

The preferred temperature for finishing bacon bits 10 is between about 0° F.-20° F. Temperatures of about 20° F.-30° F. can be used; however in this range the grease tends to collect on screen 14 so that screen 14 must be cleaned to assure the proper jarring vibratory motion is imparted to bits 10. Although temperatures much lower than 0° F., for example −110° F., can be used, it has been found to be unnecessary and that such low temperatures change the character of the product.

It should be emphasized that due to the short vibrating time vibrator 12 does not separate out or stratify the larger pieces from the smaller fines while processing bacon bits 10. The fines stay substantially mixed throughout the batch of bacon bits 10 and are therefore not segregated to the lower levels to any significant degree. Since finished bacon bits 15, including the larger pieces and fines, have a markedly improved appearance, the further and costly step of separating the fines from the larger pieces is generally not needed. The method of the invention is illustrated by the following example.

About 1000 pounds of bacon ends and pieces 2 were cooked in cooker 4. The cooked bacon, which weighed approximately 250 pounds, was placed in a container and put in chiller 6 set at a temperature of 0° F. for a period of 24 hours. After the 24 hours the temperature of the cooked bacon ranged between about 0° F. for the bacon at the surface to about 20° F. for the bacon at the center of the container. The chilled cooked bacon was removed from chiller 6 and was diced by dicer 8. Bacon bits 10 were then collected and placed on a #20 screen 14 of vibrator 12. The vibrator was set to produce a dwell time of 30 seconds to one minute on the screen. The exact length of vibrating time was determined by the operator's observation of bacon bits 10 on screen 14. Finished bacon bits 15 were then packaged at packager 16 for delivery to the user.

Modification and variation can be made to the disclosed embodiment without departing from the subject of the invention as defined by the following claims.

I claim:

1. A bacon bit finishing process comprising the following steps:
   providing cooked bacon bits at a temperature below about 20° F., said bacon bits comprising larger pieces and smaller fines; and
   vibrating said bacon bits sufficiently to dislodge the fines from the pieces and to remove sharp edges from the pieces without substantially separating the two.

2. The process of claim 1 wherein the vibration step is carried out by vibrating the bacon bits by a vibrator acting in at least two directions.

3. The process of claim 1 wherein the vibrating step is carried out by vibrating the bacon bits on a roughened surface.

4. The process of claim 3 wherein the vibrator includes a fine mesh screen with openings sufficiently small so that substantially no fines pass through the screen.

5. The process of claim 1 further comprising the step of packaging the vibrated bacon bits.

6. In a method of producing bacon bits by cooking raw bacon, cooling the cooked bacon to below about 40° F., and dicing the cooled bacon to create bacon bits including pieces and fines, the improvement comprising the following step:
   vibrating the bacon bits for a sufficient period of time while at a temperature below about 20° F. to dislodge the fines from the pieces and to remove rough edges from the pieces but without substantially separating the two, whereby the vibrated bacon bits have an enhanced visual appearance and are more pourable.

* * * * *